US007787855B2

(12) United States Patent
Zhao et al.

(10) Patent No.: US 7,787,855 B2
(45) Date of Patent: Aug. 31, 2010

(54) ESTABLISHING EMERGENCY SESSIONS IN PACKET DATA NETWORKS FOR WIRELESS DEVICES HAVING INVALID SUBSCRIBER IDENTITIES

(75) Inventors: Yilin Zhao, Northbrook, IL (US);
Naveen Aerrabotu, Gurnee, IL (US);
Mark E. Pecen, Palatine, IL (US);
Varalakshmi Likki, Gurnee, IL (US)

(73) Assignee: Motorola, Inc., Schaumburg, IL (US)

( * ) Notice: Subject to any disclaimer, the term of this patent is extended or adjusted under 35 U.S.C. 154(b) by 903 days.

(21) Appl. No.: 10/403,305

(22) Filed: Mar. 31, 2003

(65) Prior Publication Data
US 2004/0192251 A1 Sep. 30, 2004

(51) Int. Cl.
*G06F 15/16* (2006.01)
(52) U.S. Cl. .................. 455/404.1; 455/435.1
(58) Field of Classification Search .............. 455/404.1, 455/404.2, 410, 411, 412.1, 414.1, 415, 422.1, 455/432.3, 433, 435.1
See application file for complete search history.

(56) References Cited

U.S. PATENT DOCUMENTS

| 4,977,589 | A | * | 12/1990 | Johnson et al. | ............. 455/403 |
| 5,467,388 | A | * | 11/1995 | Redd et al. | ............. 379/210.02 |
| 5,712,900 | A | * | 1/1998 | Maupin et al. | ............. 455/433 |
| 6,125,283 | A | | 9/2000 | Kolev et al. | |
| 6,275,481 | B1 | | 8/2001 | Penttinen | |
| 6,418,216 | B1 | * | 7/2002 | Harrison et al. | ........ 379/208.01 |
| 6,680,998 | B1 | * | 1/2004 | Bell et al. | ..................... 379/37 |
| 2002/0111159 | A1 | | 8/2002 | Faccin et al. | |
| 2004/0121755 | A1 | * | 6/2004 | Hurtta | ..................... 455/404.1 |
| 2004/0198311 | A1 | * | 10/2004 | Aerrabotu et al. | ........ 455/404.1 |
| 2004/0198312 | A1 | * | 10/2004 | Jarett | ..................... 455/404.1 |
| 2005/0003831 | A1 | * | 1/2005 | Anderson | ................ 455/456.1 |

FOREIGN PATENT DOCUMENTS

| CN | 1252920 A | 5/2000 |
| CN | 1301469 A | 6/2001 |
| JP | 1993167532 A | 7/1993 |
| JP | 1994104812 A | 4/1994 |
| JP | 10173592 A | 6/1998 |
| JP | 1998512432 A | 11/1998 |
| JP | 20000196491 A | 7/2000 |
| JP | 2001502856 A | 2/2001 |

(Continued)

OTHER PUBLICATIONS

3GPP TSG-SA2 Meeting #30, Milan, Italy Feb. 24-28, 2003, "GPRS procedures for IMS Emergency Sessions", 38 pages.

(Continued)

*Primary Examiner*—Sam Bhattacharya
(74) *Attorney, Agent, or Firm*—Roland K. Bowler, II

(57) ABSTRACT

A method in a wireless communications network including receiving (310) a network connection request from a subscriber device having an invalid subscriber identity, connecting (340) the subscriber device, from which the network connection request was received, to the wireless communications network for limited purposes only upon determining (320) that the subscriber device has in invalid subscriber identity in the absence of a limited network connection indicator in the network connection request. In some embodiments, a limited attach message indicates that the attach request is for limited purposes.

16 Claims, 5 Drawing Sheets

FOREIGN PATENT DOCUMENTS

| | | |
|---|---|---|
| JP | 20025202209 A | 2/2002 |
| JP | 2002320263 A | 10/2002 |
| WO | 9716931 A1 | 5/1997 |
| WO | 9748247 A1 | 12/1997 |
| WO | 9848582 A1 | 10/1998 |
| WO | 9960807 A1 | 11/1999 |
| WO | WO 02/080499 A1 | 10/2002 |

OTHER PUBLICATIONS

Patent Office of the People's Republic of China Office Action; Feb. 2, 2007 for counterpart Chinese Application No. 2004/80008460.3 and English Language Translation (19 pages).

Japanese Patent Office Action; Oct. 1, 2009; for counterpart Japanese Application No. 2006-507523 and English Language Translation (5 pages).

* cited by examiner

ESTABLISHING EMERGENCY SESSIONS IN PACKET DATA NETWORKS FOR WIRELESS DEVICES HAVING INVALID SUBSCRIBER IDENTITIES

FIELD OF THE DISCLOSURE

The present disclosure relates generally to wireless communications, and more particularly to establishing emergency and other limited communications sessions for wireless communications devices having invalid subscriber identities in packet data networks, for example, a cellular communication handsets having an invalid Subscriber Identity Module (SIM), and methods therefor.

BACKGROUND OF THE DISCLOSURE

Wireless cellular subscriber terminals are generally required to register a valid subscriber identity, for example, an International Mobile Subscriber Identity (IMSI), with the cellular network before establishing communications sessions. Terminals not having a valid subscriber identity may, however, initiate emergency calls, for example, by dialing "911" in the United States.

U.S. Patent Application Publication No. US2002/0111159 A1 discloses assigning a temporary subscriber identity to a terminal having an invalid subscriber identity to permit establishment of an emergency call session over the network between the terminal and an emergency operator. The temporary subscriber identity includes an E.164 call back number (CBN), which is used to identify the terminal when calling the terminal after the original call is dropped.

WO 02/080499A1 discloses assigning an interim international mobile subscriber identity (IMSI) to a GSM GPRS or a Universal Mobile Telephone System (UMTS) mobile subscriber terminal not having a Subscriber Identity Module (SIM) card so that the subscriber terminal may place emergency calls in circuit and packet-switched networks. The interim IMSI is generated on the terminal by an interim identity generator using, among other information, an international mobile equipment identity (IMEI) associated with the subscriber terminal in the absence of a SIM card. In the network, a user identity module detects the presence of the interim subscriber identity and routes the interim identity to an interim Home Location Register (I-HLR), which is different than the conventional HLR.

Nokia recently proposed revising the Third Generation Partnership Project (3GPP), which comprises several UMTS standardization areas, to enable network identification of attach requests for emergency sessions in Generalized Packet Radio Resource (GPRS) networks. Particularly, Nokia proposed modifying 3GPP, Section 6.5 "GPRS Attach Function", to require mobile stations (MS) to provide an emergency connection indicator to the network if the attach procedure was initiated for an emergency session. Under the Nokia proposal, the network and particularly the Serving GRPS Support Node (SGSN) must not reject an attach request having an emergency connection indicator. The Nokia proposal supports mobile stations that re-attach to the network prior to each new communication session. Under the Nokia proposal, attachment requests for non-emergency sessions do not include the emergency connection indicator.

The various aspects, features and advantages of the disclosure will become more fully apparent to those having ordinary skill in the art upon careful consideration of the following Detailed Description thereof with the accompanying drawings described below.

DETAILED DESCRIPTION

The disclosure pertains generally to methods and apparatuses for enabling subscriber devices, for example, cellular radio handsets, personal digital assistants (PDAs), wireless enabled computers, among other wireless communications devices, to connect or attach to packet data communications networks for limited purposes under circumstances where access would otherwise be prohibited or denied by the network.

In one application, a subscriber device having an invalid subscriber identity is permitted to connect to the network for the limited purpose of conducting emergency sessions, for example, for making E-911 calls to emergency operators in the United States or for making similar emergency calls in other countries. In other embodiments, the subscriber device may be granted access to the communications network for limited purposes other than for urgent emergency sessions. For example, the limited attachment seeking non-emergency public services from governmental agencies, for example, for making "311" calls, which are of lesser urgency than 911 calls in some cities in the United States. In other embodiments, the limited access granted by the communications networks may be motivated by commercial incentives, for example, incentives offered by wireless carriers to increase market share, rather than by public policy.

The disclosure is applicable generally to combined circuit-switched and packet data domains and to packet data only domains. In one exemplary embodiment, the packet data network is a General Packet Radio Service (GPRS) data network, as discussed more fully below. In another embodiment, the packet data domain is a voice-over-IP packet data network. In another embodiment, the packet data domain is a 1× packet data network. In other embodiments, the packet data domain is a future generation packet data network.

Figure 1:
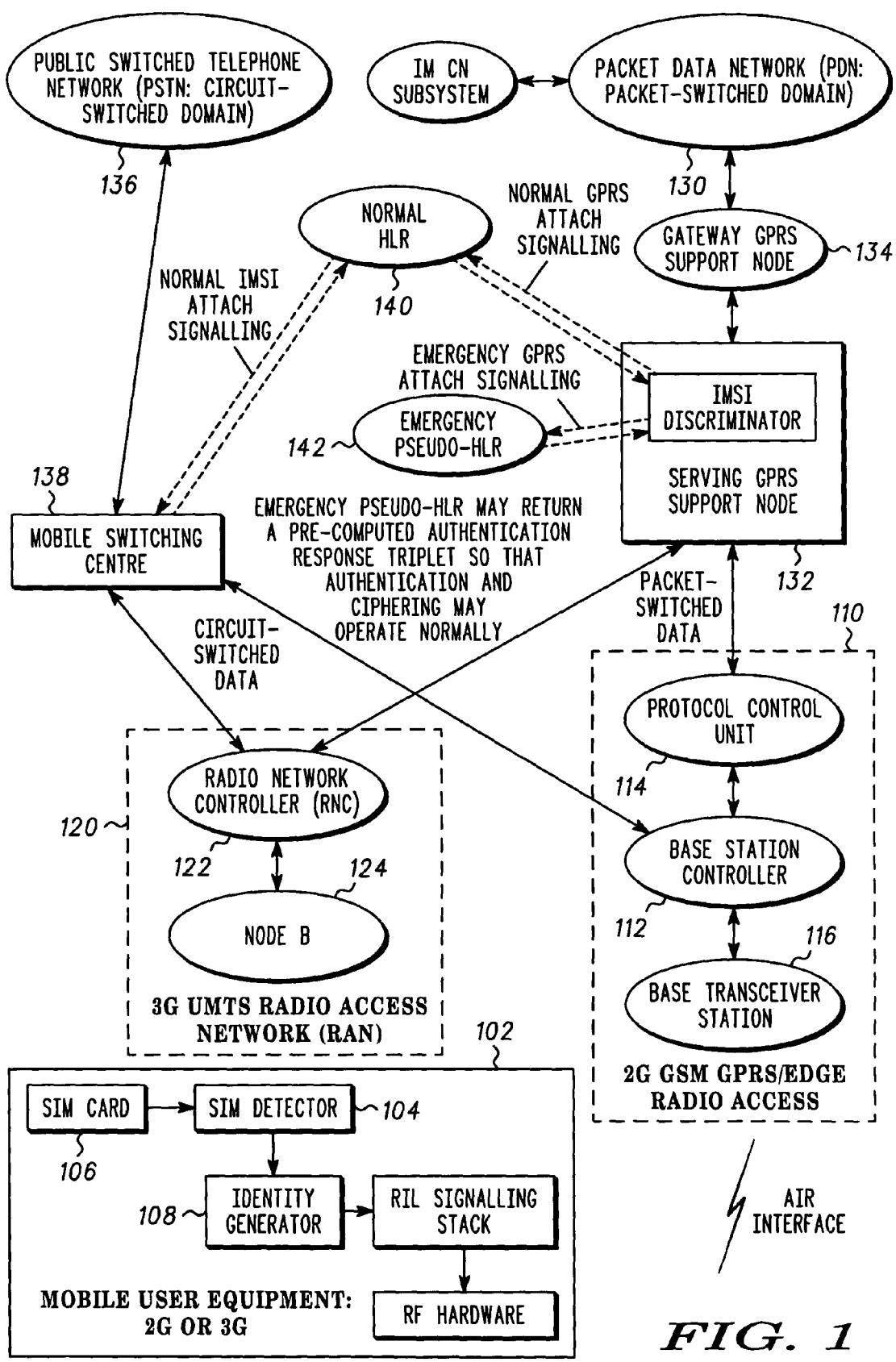
FIG. 1 is an exemplary packet data wireless communications network.

The exemplary packet data network is part of a $2^{nd}$ Generation (2G) Global System for Mobile Communications (GSM) radio access network, or part of a $3^{rd}$ Generation (3G) Universal Mobile Telephone System (UMTS) data interchange network, or a combination of 2G and 3G networks, or some other communications network. FIG. 1 is a schematic diagram of the exemplary wireless communication system 100 comprising a 2G GSM Generalized Packet Radio Service (GPRS)/Enhanced Data for Global Evolution (EDGE) radio access network 110 including a base station controller 112 coupled to a protocol control unit 116 and to one or more base station transceivers 114, which also communicate with subscriber devices, for example, with subscriber device 102 in FIG. 1. The exemplary wireless communication system 100 also comprises a 3G UMTS radio access network 120 including a network controller 122 coupled to one or more nodes 124, which also communicate with subscriber devices.

In FIG. 1, the protocol controller 114 and the network controller 122 communicate with a packet data network 130 by a Serving GPRS Support Node (SGSN) 132 and a Gateway GPRS Support Node (GGSN) 134. The base station controller 112 and the network controller 122 also communicate with a public switched telephone network 116 via mobile switching center 138.

In some embodiments, the network prohibits access to a subscriber device because the subscriber device has an invalid subscriber identity. An invalid subscriber identity may result, for example, from the absence of a subscriber identity module (SIM) within the subscriber device. A SIM is a module having subscriber identity information and other information on a removable integrated circuit (IC) card, for example, a Universal Integrated Circuit Card (UICC) in W-CDMA architectures. The absence of a SIM prevents the subscriber device from providing an International Mobile Subscriber Identity (IMSI), which is used by networks to identify subscriber devices. In other embodiments, the identity of the subscriber device is provided by some other IC, for example, a universal SIM (U-SIM) card in W-CDMA networks, or an equivalent device used in CDMA 1× architectures, etc.

An invalid subscriber identity may also result when the IMSI or other subscriber identity of the subscriber device is not recognized by the network to which the subscriber device is requesting attachment, as typically occurs, for example, in the absence of a roaming agreement with the subscriber's service provider. An invalid subscriber identity may also result because the subscriber device has an inactive SIM or other IC, which may become inactive for failure to pay or maintain the account. An invalid subscriber identity may also result where the subscriber device or SIM card is locked-out. The foregoing scenarios or circumstances that may result in an invalid subscriber identity are exemplary and not intended to be limiting. Also, there may be circumstances other than an invalid subscriber identity that form the basis for a network to refuse access to a subscriber device.

Figure 2:
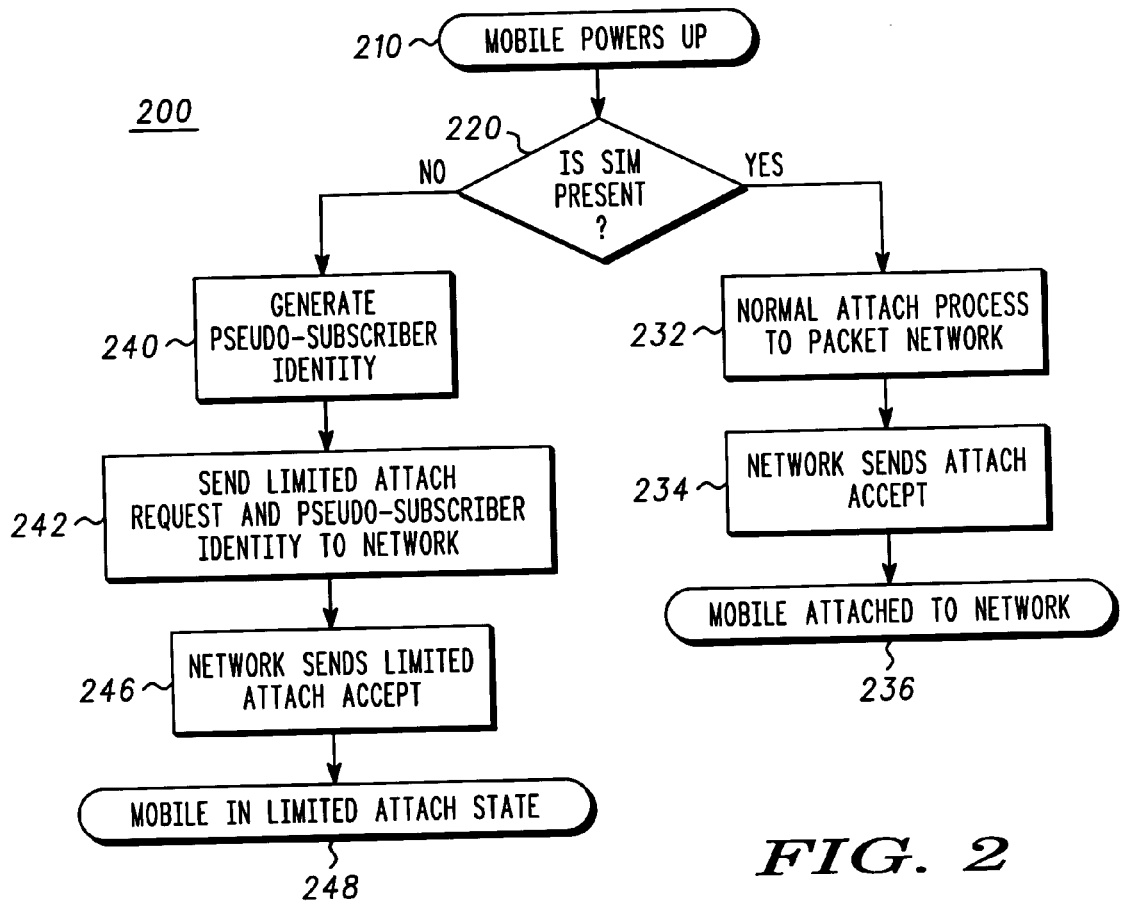
FIG. 2 is an exemplary process for attaching to a packet data network.

In the exemplary process diagram 200 of FIG. 2, at block 210, a subscriber device is powered-up or changes states or modes of operation. At block 220, in some embodiments, the subscriber device determines whether a SIM card or other IC having subscriber identity information is present or more generally whether the subscriber device has a subscriber identity, for example, whether the subscriber device has an IMSI. As suggested, in other embodiments, the device may detect something other than a SIM card, for example, a W-CDMA universal SIM (U-SIM) card, or an equivalent device used in CDMA 1× architectures, or some other removable integrated circuit (IC) card having subscriber identity information. The detection of the SIM or other IC card at block 220 may be made, for example, by a software controlled digital processor on the subscriber device that detects the presence of the SIM or IC card or based upon reading data from the SIM or IC card.

In FIG. 1, the exemplary subscriber device 102 includes a SIM card detector 104 that detects the presence of SIM card 106. The SIM detector 104 detects more generally whether the subscriber device has a subscriber identity, for example, an IMSI or other subscriber identity, for connecting to the packet data network. Detection of a SIM card in a subscriber device is also discussed, for example, in WO 02/080499 A1 entitled "Method and Apparatus for Anonymous Network Access In the Absence of A Mobile Subscriber Identity Module". In other embodiments, the subscriber device does not detect whether there is a SIM card.

In FIG. 2, at block 232, the subscriber device transmits a connection request, for example, an attach request to the packet data network. The attach request generally includes a subscriber identity. If a SIM card or other IC is present, the subscriber device sends the subscriber identity provided by the SIM card or other IC, for example, the IMSI, to the network. In other embodiments, the subscriber identity may be something other than an IMSI, as discussed further below. The attach request is transmitted by a processor controller transmitter of the subscriber device, as is known generally by those having ordinary skill in the art.

Figure 3:
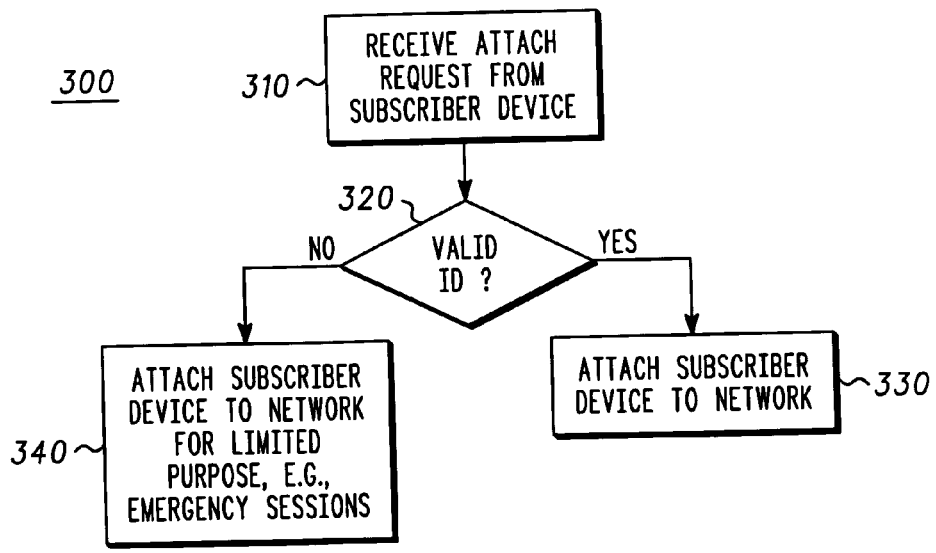
FIG. 3 is an exemplary process for attaching a subscriber device having an invalid subscriber identity to a packet data network.

In the exemplary process diagram 300 of FIG. 3, at block 310, a wireless packet data communications network receives a network connection request, for example, the attach request referenced at block 232 in FIG. 2, from a subscriber device, including its subscriber identity. In FIG. 3, at block 320, the network determines whether the subscriber identity received from the subscriber device is valid. If the subscriber identity is valid, the network attaches the subscriber device to the network at block 230. In FIG. 2, at block 234, some networks send an attach acceptance to the subscriber device, confirming that the subscriber device is or will be attached to the network, as indicated at block 236. Validity of the subscriber identity is performed generally at the network by a digital processor under software control.

In FIG. 3, at block 340, in one embodiment, if the network determines that a subscriber identity of the subscriber device is invalid, the network automatically attaches the subscriber device to the network for a limited purpose, for example, for emergency sessions only. These and other functional aspects of the network are performed under control of a software controlled digital processor. According to this aspect of the disclosure, the automatic attachment is performed preferably with additional information from the subscriber device, for example, it is not necessary for the subscriber device to send a limited or an emergency attach indicator with the attach request. Under these exemplary circumstances, the network attaches the subscriber device to the network for a limited purpose based merely on the existence of an invalid subscriber identity. The limited attach may be for emergency sessions only and/or as a means to provide subscriber incentives for subscribing to network services, etc., as discussed above.

As noted, an invalid subscriber identity received by the network may be an IMSI or other subscriber identity that is not subject to a roaming agreement with the network that receives the request. In FIG. 1, the exemplary network determines whether the subscriber identity is valid by checking the Home Location Register (HLR) 140. As suggested, in some instances, the subscriber identity is not located on the HLR, for example, in cases where there is no roaming agreement between the network receiving the attach request and the subscriber's home network, and in instances where the subscriber device sends a pseudo-subscriber identity because there is no SIM card or similar device with a subscriber identity on the device. In other instances the subscriber identity is listed on the HLR, but the subscriber identity may be invalid or inactive, for example, because the subscriber's account is in arrears.

In some embodiments, for example, where the subscriber device is attached to the network only for emergency sessions, it is desirable for the subscriber device to remain attached to the network after termination of the session, for example, after ending an E-911 call. By maintaining the network connection with the subscriber device after the subscriber device terminates the session, the subscriber device may receive calls after the initial session has ended. In the exemplary embodiment, the network pages the subscriber device using the subscriber identity to indicate that the subscriber has a return call, for example, a call from an emergency operator.

In some embodiments, the subscriber device remains attached to the network for a specified period after termination of the session. For example, the Federal Communications Commission requires that E-911 callers be able to receive a call back within a specified time period after the emergency session has ended. Such an attachment scheme is desirable for subscriber devices that attach to the network for limited times associated with each session and which detach upon completion of the session. In other networks, for example, packet data only networks not in a circuit switched domain, the subscriber device attaches to the network on power-up and remains attached until power-down or until the expiration of a specified time period or the performance of some other event by the network or by the subscriber device, rather than upon termination of a session. It may be desirable under these circumstances to ensure that the network does not detach the subscriber device within a specified time period after an emergency session.

Figure 4:
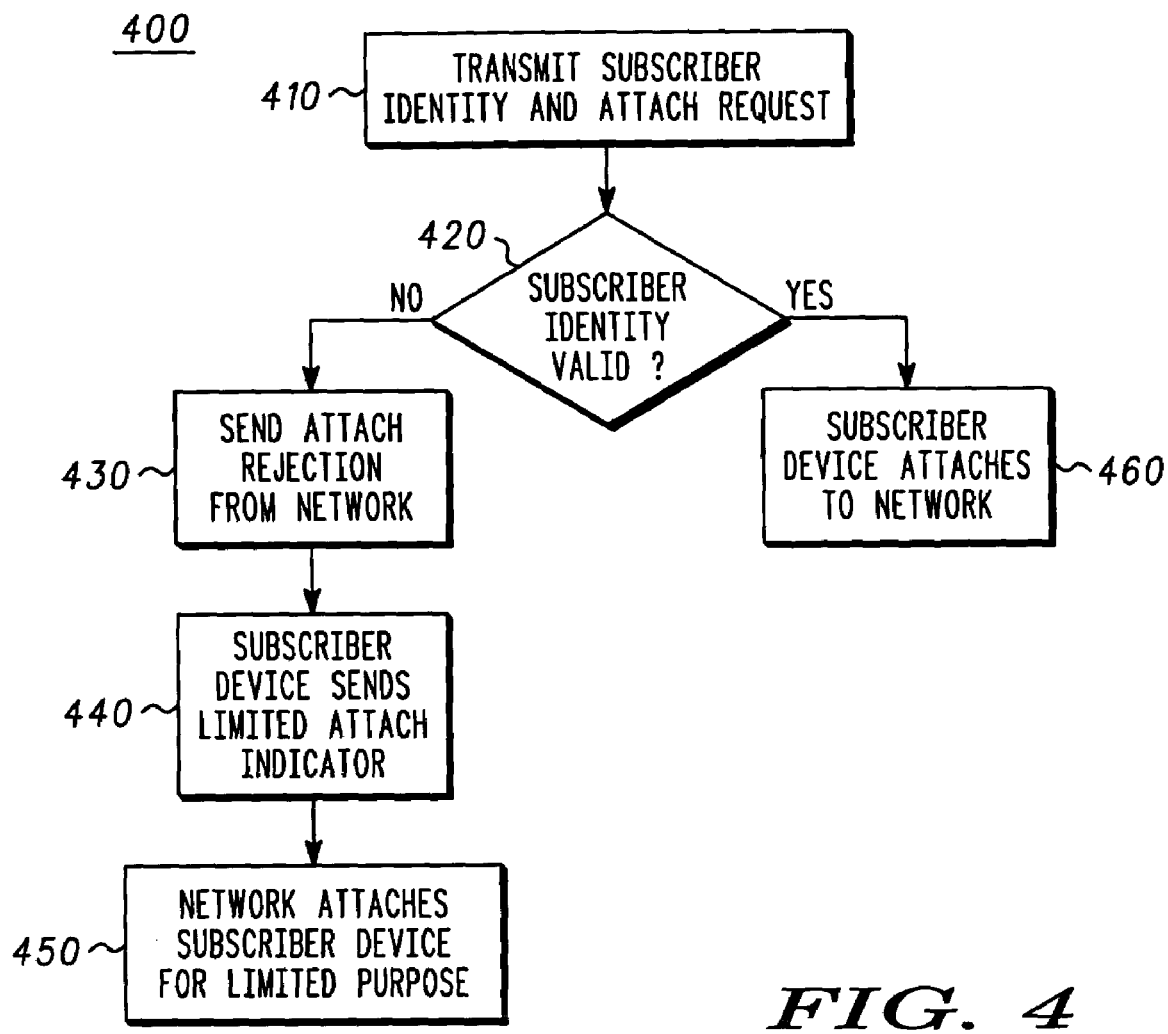
FIG. 4 is another exemplary process for attaching a subscriber device having an invalid subscriber identity to a packet data network.

According to another aspect of the invention, in the process 400 of FIG. 4, at block 410, the subscriber transmits a network connection request and a subscriber identity to the network. The subscriber identity is typically included in the request. At block 420, if the network determines that the subscriber identity is invalid, the network sends an attach rejection at block 430, in response to receiving the request with the invalid subscriber identity. Thus unlike the exemplary embodiment discussed above in connection with FIG. 3, the network does not automatically attach the subscriber device in the process exemplified by the diagram in FIG. 4.

At block 440 in FIG. 4, the subscriber device sends a limited attach request to the network in response to receiving the attach rejection transmitted from the network at block 430. In one embodiment, the subscriber device transmits another attach request including a limited attach indicator, for example, an emergency attach indicator notifying the network that the subscriber is requesting attachment for emergency sessions only. In other embodiments, the limited attach may limit network access for a trial period in an effort to induce new subscribers. At block 450, the network attaches the subscriber device having the invalid subscriber identity for a limited purpose.

At block 460, the subscriber device is attached to the network pursuant to the normal procedure if its subscriber identity is valid, for example, as discussed above in connection with blocks 232, 234 and 236 in FIG. 2. Unlike, the process in the exemplary embodiment of FIG. 2, the process in the embodiment of FIG. 4 does not require that the subscriber device determine whether a SIM is present before sending the request. In subscriber devices that detect the presence of a SIM, the device does not know whether an attach request will be denied until it attempts to attach to a network. In some embodiments, the network's refusal to attach the subscriber device to the network indicates to the subscriber device that the subscriber device must send a limited attach request indicator. In other embodiments, the limited attach request may be sent when the subscriber device senses that an emergency session is going to be activated by the device.

According to another aspect of the disclosure, upon detecting the absence of a SIM or other IC including subscriber identity information, the subscriber device may conclude that networks will refuse normal attachment requests. Under these circumstances, in some embodiments, the subscriber device may include a limited attach indicator with the attach request as discussed further below.

In one embodiment, if the subscriber device does not detect a SIM card, for example, as determined in FIG. 2 at block 220, the subscriber device generates at block 240 a pseduo-subscriber identity for transmission to the network with the connection request. In FIG. 1, the subscriber device 102 includes an identity generator 108 for generating a pseudo-subscriber identity. In one embodiment, the pseudo-subscriber identity is a subscriber device equipment identification, for example, an ESN used to identify CDMA equipment, or an IMEI number used to identify GSM equipment, instead of the IMSI or other subscriber identity.

In another embodiment, the pseudo-subscriber identity is an interim international mobile subscriber identity (IMSI) generated by the subscriber device for transmission to the network, as disclosed for example, in WO 02/080499 A1 entitled "Method and Apparatus for Anonymous Network Access In the Absence of A Mobile Subscriber Identity Module". In some forms, the interim IMSI conforms to known length characteristics of an IMSI used when the SIM card is inserted within the mobile user device, and includes a predetermined unused interim mobile country code, a predetermined unused interim mobile network code, and pseudo-random digits associated containing a portion of an international mobile equipment identity (IMEI) associated with the mobile user device. The interim IMSI may be generated using one or more of local information containing an international mobile equipment identity (IMEI) corresponding to the mobile user device, local information containing a pre-computed SRES, local information containing a pre-computed ciphering key, a combination of identities that reside on the SIM card, and portions of identities that reside on the SIM card. The pseduo-subscriber identity may generally be any identity that the network may use to identify the device, for example, for registration and call back purposes.

In some embodiments, for example, the process discussed in connection with FIG. 3, the subscriber device sends the pseudo-subscriber identity with the request to the network without including limited attach request bits or information. In some circumstances, for example, where the subscriber device has determined that it has an invalid subscriber identity, it may be desirable to send a limited attach request indicator with the initial attach request. FIG. 2, at block 242, the subscriber device sends the pseudo-subscriber identity to the network with a request for a limited attach. At block 246, the network replies with a limited attach acceptance indicating that the subscriber device is or will be attached to the network for limited purposes, as indicated at block 248.

In some embodiments, when the network receives an invalid subscriber identity, for example, an unrecognized or inactive IMSI, or an ESN or IMEI or an interim IMSI, the network registers that invalid subscriber identity with the network. In FIG. 1, for example, the pseudo-subscriber identity is stored in a pseudo-HLR 142. Alternatively, the invalid subscriber identity may be stored in the HLR 140 or in some other designated location. Registration of invalid or pseudo-subscriber identities are also disclosed in WO 02/080499 A1 entitled "Method and Apparatus for Anonymous Network Access In the Absence of A Mobile Subscriber Identity Module".

In one embodiment, transmission of a limited connection indicator includes transmitting a combination of bits indicating that the network connection requested is for limited purposes, for example, for emergency sessions only. In one embodiment, the connection request includes one of the following bit three-bit combinations: 000; 100; 101; 110; and 111, which indicate to the network that the attach request by the subscriber device is for a limited purpose.

Figure 5:
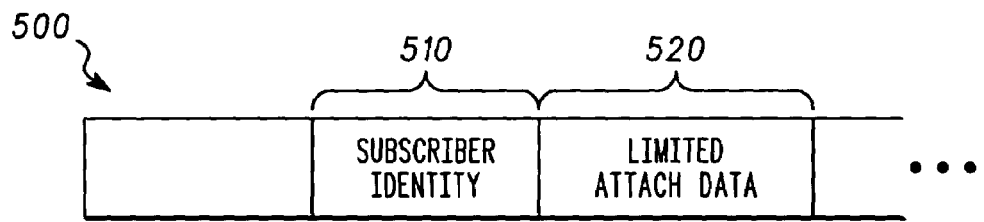
FIG. 5 is an exemplary packet data network attach request message.

FIG. 5 illustrates an exemplary packet-data network attach request message 500 for transmission from a wireless subscriber device to a wireless communications network. The exemplary attach request message comprises, generally, a subscriber identification field 510 for indicating a subscriber identity, for example, an IMSI or some other identity examples of which were discussed above. The exemplary message 500 also includes a limited attach field 520 for indicating that the attach request is for limited purposes, examples of which were also discussed above. The message may also include other information required as part of the particular packet data protocol.

Typically for a subscriber device to connect to a network, it must first attach, as discussed above, and then initiate PDP Context Activation. According to another aspect of the disclosure, the subscriber device initiates PDP Context Activation without attaching to reduce signaling and complexity.

Figure 6:
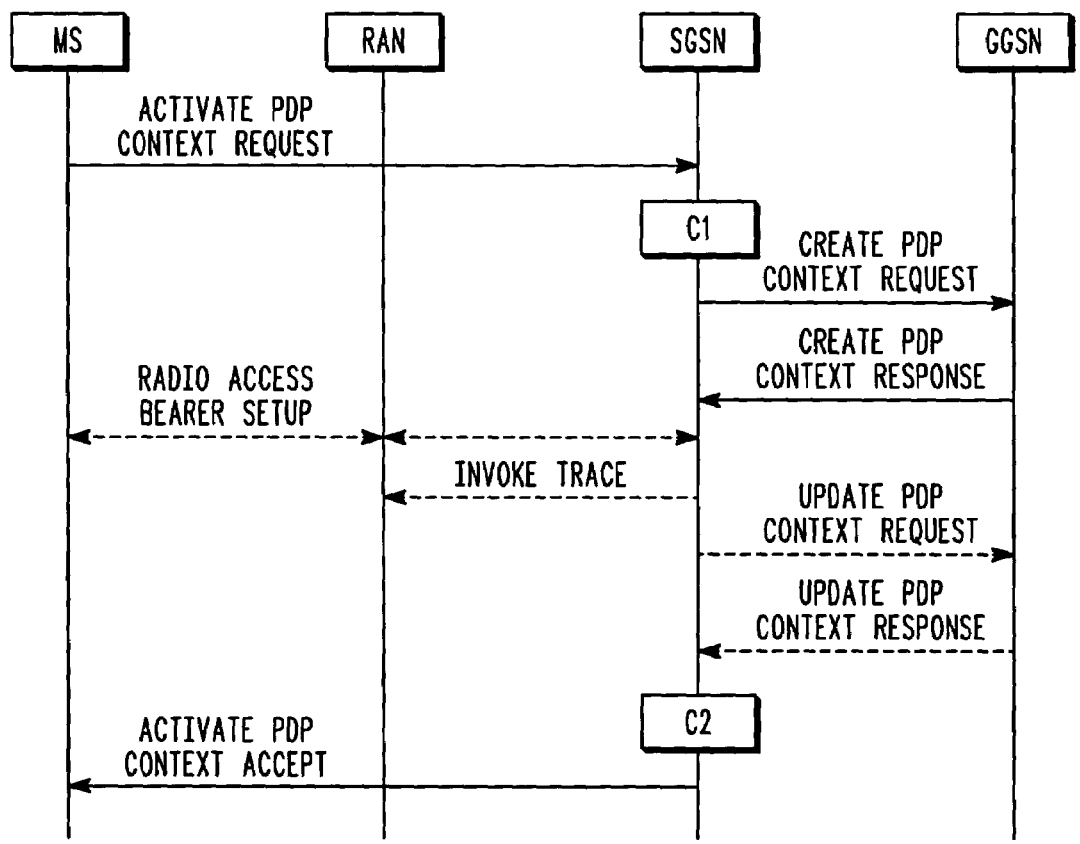
FIG. 6 is an exemplary signaling diagram for communicating with the network without first sending an attach request.
Figure 7:
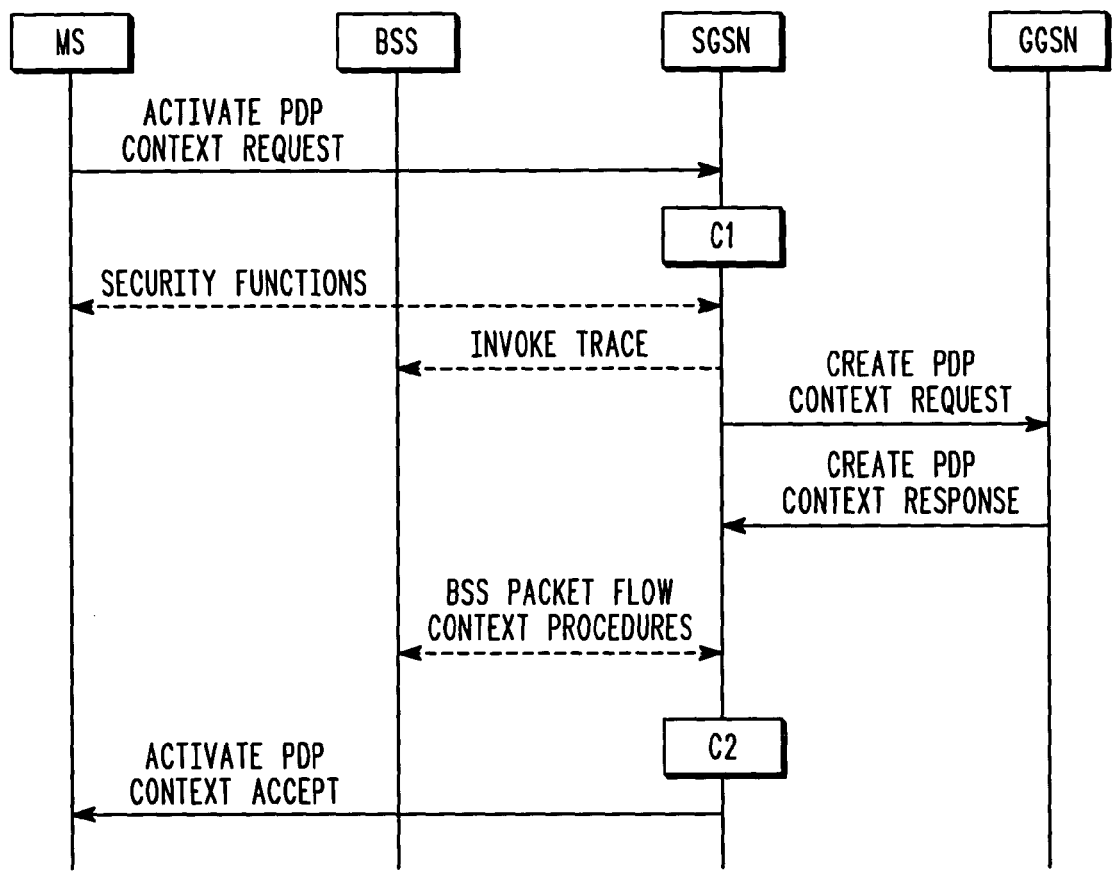
FIG. 7 is another exemplary signaling diagram for communicating with the network without first sending an attach request.

FIGS. 6 and 7 illustrate exemplary signaling diagrams for communicating with the network without first sending an attach request. In one embodiment, the subscriber identity is included with the PDP context request. The network may use the subscriber identity as discussed above, for example, if the subscriber identity in the PDP Context request is invalid, the network may automatically attach the subscriber device to the network for limited purposes. Inclusion of the subscriber identity in the PDP Context Activation Request may also enable the network to page the subscriber device for return calls.

In one embodiment, the network is notified that a session is an emergency session, rather than a non-emergency session, by configuring QoS parameters for PDP context activation in a pre-determined manner that will be recognized by the network as pertaining to emergency sessions. In another embodiment, the network is notified that a session is an emergency session by including an emergency session indicator, for example, a combination of bits as discussed above, in the PDP Context Activation request.

While the present disclosure and what are considered presently to be the best modes of the inventions have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a wireless subscriber device having a subscriber identity, the method comprising:
   transmitting, from the wireless subscriber device, a network connection request and the subscriber identity;
   receiving, at the wireless subscriber device, a network connection rejection in response to transmitting the network connection request and the subscriber identity;
   transmitting, from the wireless subscriber device, an emergency connection indicator after receiving the network connection rejection,
   the emergency connection indicator includes a combination of bits indicating that the requested connection is for emergency sessions only.

2. The method of claim 1, receiving an emergency connection acceptance after transmitting the emergency connection indicator.

3. The method of claim 1,
   the network connection request is an attach request,
   transmitting an international mobile subscriber identity with the attach request.

4. The method of claim 1, sending the combination of bits includes sending one of the following three-bit combinations: 000; 100; 101; 110; and 111.

5. The method of claim 1, sending the network connection request upon powering-up the wireless subscriber device.

6. The method of claim 5, connecting to the network after sending the emergency connection indicator, remaining connected to the network until powering-down the wireless subscriber device or upon expiration of a time period.

7. A wireless subscriber device having a subscriber identity, the wireless subscriber device comprising:
   a processor coupled to a transmitter;
   the processor for controlling the transmitter to transmit a network connection request and the subscriber identity upon powering-up the wireless subscriber device,
   the processor for controlling the transmitter to transmit an emergency connection indicator in response to receiving a network connection rejection.

8. The wireless subscriber device of claim 7, the processor for controlling the transmitter to transmit the emergency connection indicator as a combination of bits indicative of connecting to the network for emergency sessions only.

9. The wireless subscriber device of claim 8, the processor for controlling the transmitter to transmit the emergency connection indicator as one of the following bit combinations: 000; 100; 101; 110; and 111.

10. A method in a wireless communications network, the method comprising:
    receiving, at the wireless communications network, a network connection request and an invalid subscriber identity from a subscriber device in the network;
    transmitting, from the wireless communications network, a network connection rejection to the subscriber device from which the invalid subscriber identity was received in response to receiving the invalid subscriber identity;
    receiving, at the wireless communications network, a limited connection indicator from the subscriber device from which the invalid subscriber identity was received in response to transmitting the network connection rejection;
    connecting the subscriber device, from which the invalid subscriber identity was received, to the network for an emergency session in response to receiving the limited connection indicator from the subscriber device;
    maintaining the network connection to the subscriber device from which the invalid subscriber identity was received after the subscriber device terminates an emergency session.

11. The method of claim 10, paging the subscriber device from which the invalid subscriber identity was received after termination of the emergency session.

12. The method of claim 10, the limited connection indicator is an emergency connection indicator, receiving the emergency connection indicator includes receiving a combination of bits indicating that the network connection is for emergency sessions only.

13. The method of claim 10, the limited connection indicator is an emergency connection indicator, receiving the emergency connection indicator includes receiving one of the following bit combinations: 000; 100; 101; 110; and 111.

14. A method in a wireless communications network, the method comprising:
   receiving, at the wireless communications network, a network connection request from a subscriber device having an invalid subscriber identity;
   connecting the subscriber device, from which the network connection request was received, to the wireless communications network for limited purposes upon determining that the subscriber device has an invalid subscriber identity, in the absence of a limited network connection indicator in the network connection request;
   paging the subscriber device from which the invalid subscriber identity was received after termination of the emergency session.

15. The method of claim 14,
   receiving the network connection request from the subscriber device devoid of an emergency network connection indicator,
   connecting the subscriber device, from which the network connection request was received, to the wireless communications network for emergency sessions only upon determining that the subscriber device has in invalid subscriber identity in the absence of an emergency network connection indicator in the network connection request.

16. The method of claim 14, maintaining the network connection to the subscriber device from which the invalid subscriber identity was received after the subscriber device terminates an emergency session.

* * * * *